Nov. 10, 1953

J. F. SHANNON 2,658,525

DIAPHRAGM TYPE EXPANSIBLE CHAMBER OPERATOR

Filed Sept. 3, 1948

INVENTOR.
JACK F. SHANNON
BY
Raymond W. Jenkins
ATTORNEY

INVENTOR.
JACK F. SHANNON
BY Raymond W. Junkins
ATTORNEY

Patented Nov. 10, 1953

2,658,525

UNITED STATES PATENT OFFICE 2,658,525

DIAPHRAGM TYPE EXPANSIBLE CHAMBER OPERATOR

Jack F. Shannon, Euclid, Ohio, assignor to Bailey Meter Company, a corporation of Delaware Application September 3, 1948, Serial No. 47,616

5 Claims. (Cl. 137—787)

My invention relates to regulating devices and particularly to motor operated control valves for regulating or controlling the rate of flow of fluid passing through the valve body. Many types of valves are known for this service and it is immaterial, insofar as this invention is concerned, what kind or type of valve is used; my invention being only concerned with providing improved means for the power positioning of the movable part or parts within the valve body responsive to a control impulse or dictation which may be established at a remotely located measuring or controlling instrumentality. In fact my invention is quite specifically directed to what is known as a diaphragm motor valve wherein the power motor includes one or more flexible members such as diaphragms, bellows, or the like, to which are applied fluid loading pressures for positioning the movable parts.

Figure 1:
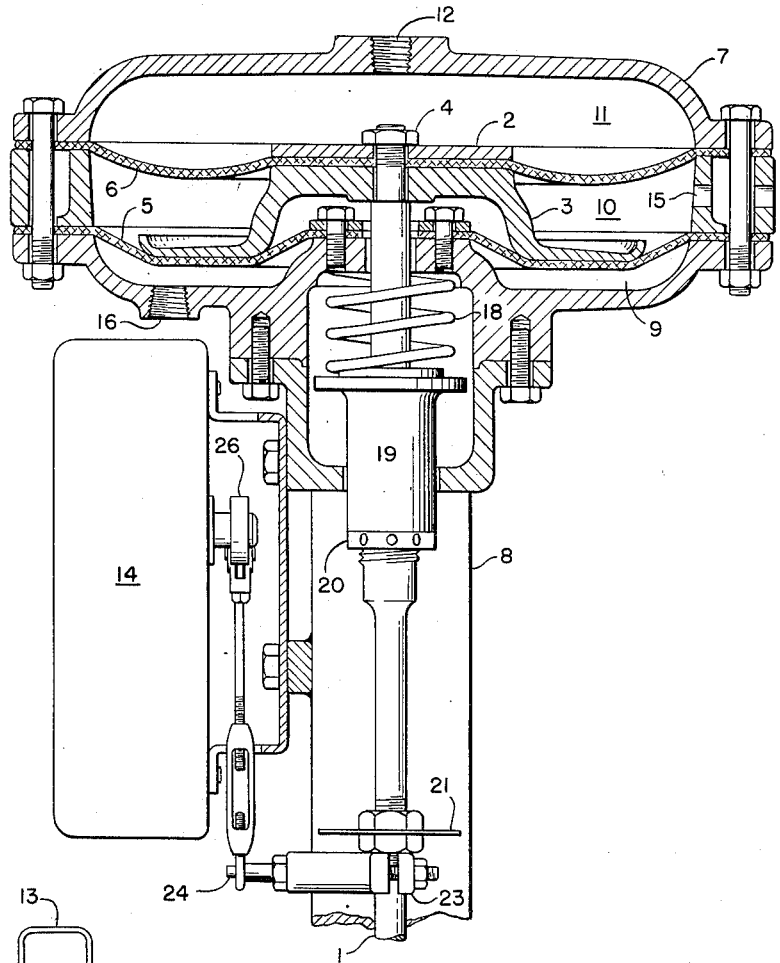
Fig. 1 is a sectional elevation of the top mounting of a regulating valve.
Figure 2:
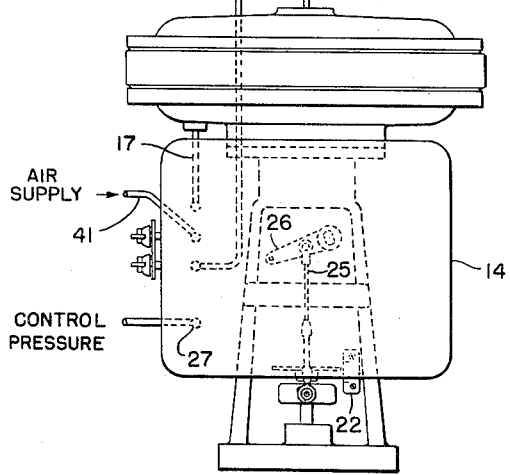
Fig. 2 is an elevation outline of Fig. 1 at 90 degrees.

Referring now to Fig. 1 the stem 1 of a regulating valve moves vertically (on the drawing) to position the inner flow regulating parts of the valve (not shown). At its upper end the stem is fastened to diaphragm clamping plates 2, 3 by a nut 4. A lower area of plate 3 contacts a diaphragm 5 while a second diaphragm 6 is held between the plates 2, 3. The mentioned parts are housed by a casing 7 mounted on valve yoke 8 and forming, with the diaphragms, chambers 9, 10 and 11. The lower diaphragm 5 is clamped around its center to the casing 7 with clearance around the stem 1 so that the latter may freely move with diaphragm 6 and its clamping plates 2, 3. It will be understood that I may use bellows or similar flexible partitions instead of diaphragms.

Fluid pressure is made effective within chamber 11 through a pipe connection 12 from a pipe 13 joining a valve positioner 14. Chamber 10 is open to the atmosphere both around the stem 1 and by way of a passage 15. Fluid pressure is made effective within chamber 9 through a pipe connection 16 from a pipe 17 joining the valve positioner 14. The arrangement is such that if pressure within chamber 11 is greater than that within chamber 9 the stem 1 will be moved downwardly, while if the pressure within chamber 9 predominates, the stem 1 will be moved upwardly.

A very light, short coil spring 18 is shown surrounding the stem 1 with its upper end bearing against the fixed bottom of casing 7 and with its movable lower end resting upon the top of a sleeve member 19 which surrounds the stem 1 and is adjustable axially thereof through a nut 20. Thus the sleeve 19 moves with the stem for varying the compression of spring 18. An indicator 21 moves with the stem 1 relative to a scale 22 to show the position of the stem and thus the position of the concealed valve parts in the valve body. Such movement may usually be in the nature of 1, 2 or 3 inches total travel.

Adjustably clamped to the stem 1, by means 23, is the pivot 24 of a rod 25 arranged to angularly position the arm 26 of the positioner 14 to provide a motion tie-back from the valve stem 1 to the positioner.

Figure 4:
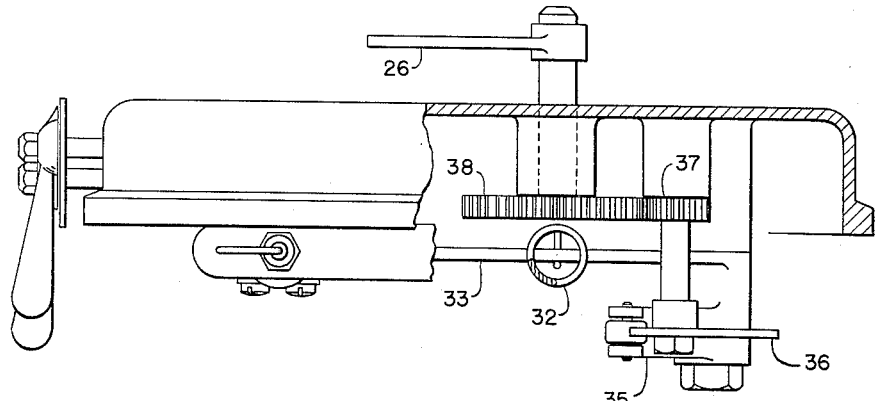
Fig. 4 is a plan in partial section along the line 4—4 of Fig. 3.
Figure 3:
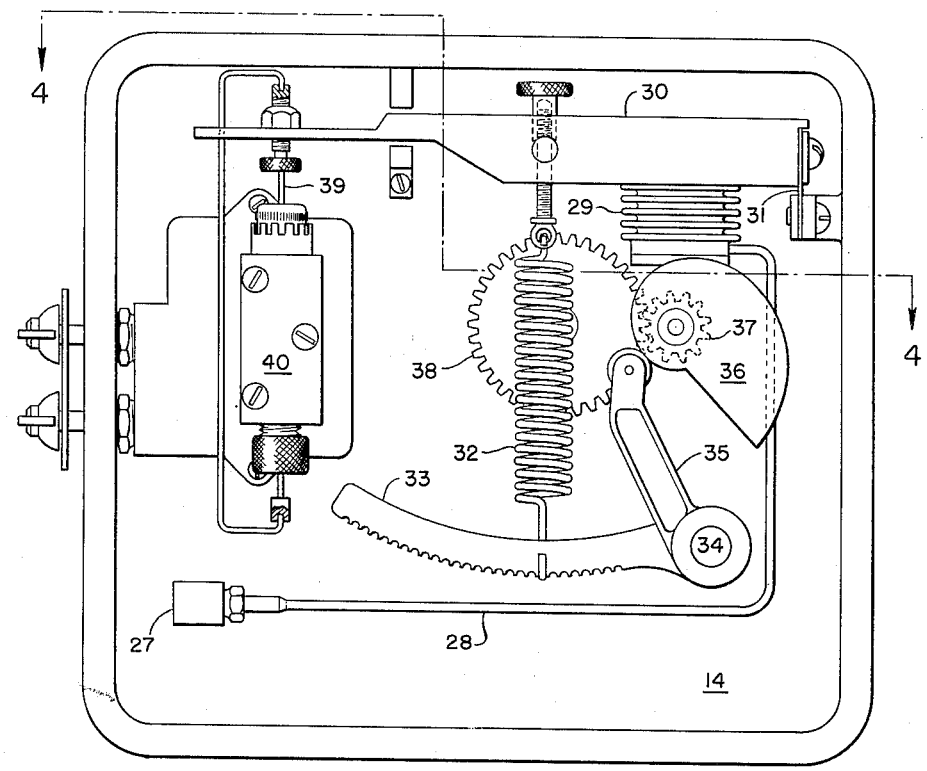
Fig. 3 is a front elevation of a valve positioner with its cover removed.

The positioner 14 is shown in greater detail in Figs. 3 and 4 and is described and claimed in the copending application of Harvard H. Gorrie and Jack F. Shannon, Serial No. 47,516 filed September 2, 1948. The control pressure, originating at a measuring or controlling instrumentality and transmitted to the positioner 14 for directing positioning of valve stem 1, is available at pipe connection 27 from which it is effective through pipe 28 upon the interior of bellows 29. The bellows 29 is arranged to angularly move a beam 30 about its pivot 31. Opposing angular movement of beam 30 is a loading spring 32 whose upper end is adjustably carried by the beam and whose lower end is engaged to an arm of a bell-crank 33. The bell-crank is pivoted at 34 and has a second arm 35 carrying a follower roller bearing against the surface of a cam 36. The cam 36 is driven through gears 37, 38 by the arm 26 comprising the motion-tie-back from the valve stem 1.

Movement of beam 30, around its pivot 31, is thus influenced by the control pressure acting within bellows 29 and by the spring 32 variably loaded by the position of stem 1 acting through a characterizing cam 36.

The beam 30 is adapted to position the movable member 39 of a pilot valve 40 to which air is supplied under pressure through a pipe 41 and from which two loading pressure pipes 13 and 17 lead to the chambers 11 and 9 respectively.

Assume, for example, that an upward movement of valve stem 1 results in an opening of the valve to increase the rate of flow of a fluid therethrough and that a measuring-controlling instrumentality has increased the control pressure effective at pipe connection 27 to ask that the fluid flow through the valve be increased.

As explained in detail in said copending application the positioner 14 acts as a characterizing relay to insure that the valve stem is positioned, responsive to changes in control pressure, the desired amount regardless of whether that be in direct proportion to change in control pressure or in functional relation thereto. If the cam 36 is a linear cam then a change in control pressure causes a sufficient change in differential pressure between chambers 11 and 9 to cause the valve stem to move in linear relation regardless of valve stem packing friction, lag, or any other reason opposing movement; the motion tie-back 25, 26, 33 and 32 allowing force to build up for such motion until the proper motion has been accomplished. It may be, however, that equal increments of valve stem motion will not result in equal increments of change in rate of fluid flow, in which event the cam 36 is shaped to take the actual characteristic into account, to the end that equal increments of change in control pressure will produce desired changes in rate of fluid flow regardless of actual valve stem position or change in position.

As the control pressure in 27, 28 and 29 is increased, the force of bellows 29 upon beam 30 angularly moves the beam in a clockwise direction around its pivot 31 against the action of spring 32. Such beam movement raises pilot stem 39 thus increasing the pneumatic loading pressure effective through pipe 17 within chamber 9. Simultaneously, the upward movement of pilot stem 39 decreases the pneumatic loading pressure effective through pipe 13 within chamber 11. The result of an increase in pressure in chamber 9 and a decrease in pressure in chamber 11 is an urging of parts 5, 3, 6, 2 and 1 upwardly, which is what was desired. Upward movement of stem 1, acting through tie-back members 25, 26, 38, 37, 36, 35, 33 and 32 increases the loading of spring 32 upon beam 30 until the pressure within bellows 29 is balanced and pilot stem 39 is returned to its neutral position blocking the entrance to pipes 13 and 17 with the result that the pressure in chamber 9 and that in chamber 11 is fixed and no further movement of valve stem 1 is made.

Prior valve motors of this general type have had a single spring-loaded diaphragm against which is imposed a single loading pressure. The diaphragm, and valve stem, are thus urged to move in one direction by the loading pressure and in the other direction by the loading spring. A pilot valve is used which develops a single loading pressure which may have a range of say 5 to 25 p. s. i. for full valve stem travel. With such a construction, small changes in loading pressure may fail completely to result in valve stem motion, i. e. it may take a considerable change in loading pressure to overcome friction, spring inertia, etc. This is particularly true near the limits of travel. Such a valve may be arranged so that failure of control pressure causes the valve to move to an open position by spring action and with this arrangement it may be necessary to build up several p. s. i. air pressure upon the diaphragm to overcome the initial spring setting and to cause the valve to begin to close and a considerable pressure to hold it in a closed position. On the other hand the valve may be designed to move to a closed position by spring action upon failure of control pressure in which event several p. s. i. loading pressure may be required to begin to open the valve against the spring action. In either event, a considerable amount of air must be transferred to or from the diaphragm chamber to build up or to release sufficient pressure and this influences the speed of response which is dependent upon size of pilot, connecting piping, etc.

My present construction is completely independent of loading spring strength and characteristic and in most instances I would not employ a spring at all. By employing a double-acting pilot and opposed chamber top-mounting I attain greater speed, sensitivity and accuracy of positioning than with prior constructions. The effect of each increment of pressure increase in one chamber is doubled because of the simultaneous release of the same increment of pressure from the opposing chamber. I may even so arrange the pilot valve that the speed of positioning is different in one direction than in the other. For instance the valve may be caused to move in a closing direction at greater speed than in an opening direction, or vice versa.

The arrangement allows, if necessary, the build-up of considerably greater moving force if valve friction or the like is encountered. With an air supply pressure of say 0–25 p. s. i. available at 41 a slight movement of pilot stem 39, would, in the prior spring opposed construction, result in only a small pressure change against the diaphragm to oppose the loading spring. Valve stem friction might keep the valve from moving at all for such slight pressure change. With the present invention, the pressure acting to position the valve stem might build up a force to full 25 p. s. i. due to the fact that while the pressure builds up in one chamber it bleeds down to atmospheric pressure in the opposing chamber, something that the spring could not do. With the present small displacement and minimum amount of air to move I obtain accurate and fast valve positioning upon changes of plus (and simultaneous minus) pressure changes of ¼ p. s. i.

In general the arrangement provides considerably more force for moving the valve parts since it is possible to use full differential pressure across the unit without having most of the air pressure absorbed by a loading spring. Full power is available for positioning the valve rather than in overcoming a spring, thus avoiding extremely large diaphragms and very heavy springs which have previously been necessary to assure tight shut-off of valves under considerable line pressure.

It will, of course, be evident that the constructional arrangement may be different than that shown in the drawings. For example, the effective area of diaphragm 6 may be made to equal that of diaphragm 5, or any desired proportioning of the two may be made. While I have shown, in Fig. 1, the use of a very light spring 18 which may be desired for moving the valve stem in one direction upon air failure or to hold against a hand jack, the spring is preferably dispensed with and pressure differential alone is employed.

What I claim as new and desire to secure by Letters Patent of the United States, is:

1. Power structure for positioning a working member including, a casing receiving an end of the working member therein, a first flexible wall cooperating with a first portion of the casing interior wall to form a first pressure chamber, said working member operatively connected to said first flexible wall and responsive thereto, an apertured second flexible wall secured at the aperture to said casing and at its periphery to said casing, said working member received through said aperture, a rigid member attached to the end of the working member and bearing on said second flexible wall, a second pressure chamber formed by said second flexible wall and said casing, and said working member actuated by movement of said rigid member positioned by said flexible walls responsive to fluid pressures.

2. The combination of claim 1 wherein the flexible walls are diaphragms.

3. The combination of claim 1 including a relatively light spring opposing movement of the working member in one direction.

4. A differential pressure transmitting structure including, a casing receiving a longitudinally positionable shaft therein through an aperture, a first diaphragm provided with an aperture secured to the aperture of said casing and the periphery of said diaphragm attached to said casing forming a toroidal pressure chamber between said first diaphragm and said casing, a concave disc attached to said shaft with the rim of said disc bearing on the said first diaphragm member, and a second diaphragm member attached to said shaft with said second diaphragm secured to the casing wall at the periphery of said diaphragm to form a pressure chamber opposite the aperture.

5. The combination of claim 4 including a relatively light spring opposing movement of the shaft in one direction.

JACK F. SHANNON.

References Cited in the file of this patent

UNITED STATES PATENTS

| Number | Name | Date |
| --- | --- | --- |
| 361,884 | Moore | Apr. 26, 1887 |
| 1,798,932 | Dreiske | Mar. 31, 1931 |
| 1,871,044 | Crosthwait | Aug. 9, 1932 |
| 2,138,212 | Scofield | Nov. 29, 1938 |
| 2,237,038 | Moore | Apr. 1, 1941 |
| 2,298,112 | Edwards | Oct. 6, 1942 |
| 2,341,502 | Ingres | Feb. 8, 1944 |
| 2,382,941 | Moore | Aug. 14, 1945 |
| 2,432,705 | Williams | Dec. 16, 1947 |
| 2,507,498 | Brown | May 16, 1950 |
| 2,536,184 | Johnson | Jan. 2, 1951 |

FOREIGN PATENTS

| Number | Country | Date |
| --- | --- | --- |
| 14,235 | Germany | July 1, 1881 |